Aug. 5, 1924.
R. F. SCHUCHARDT
METER
Filed May 20, 1921    10 Sheets-Sheet 1
1,504,082
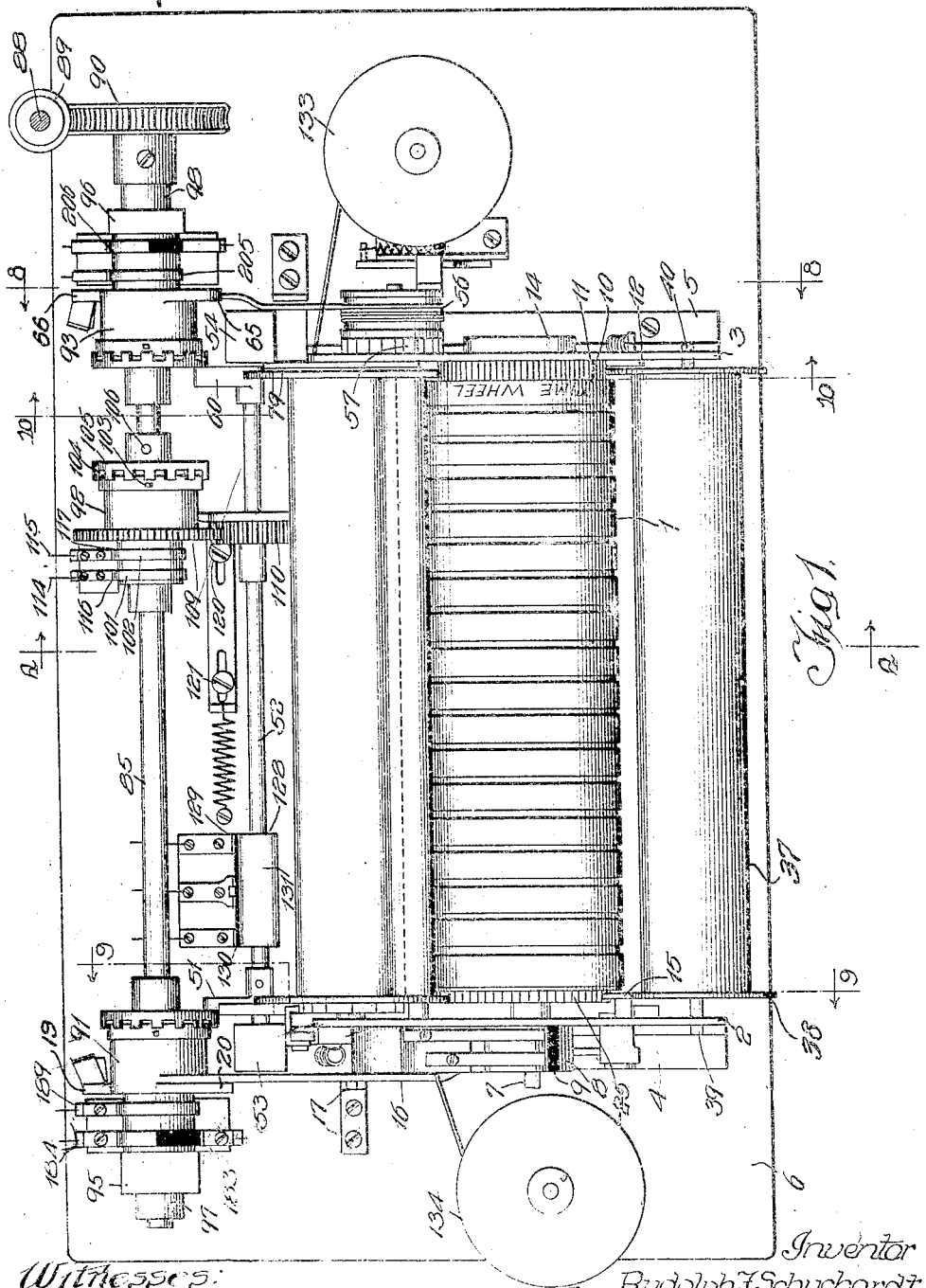
Witnesses:
Inventor
Rudolph F. Schuchardt
By Brown, Boettcher & Dienner
Att'ys

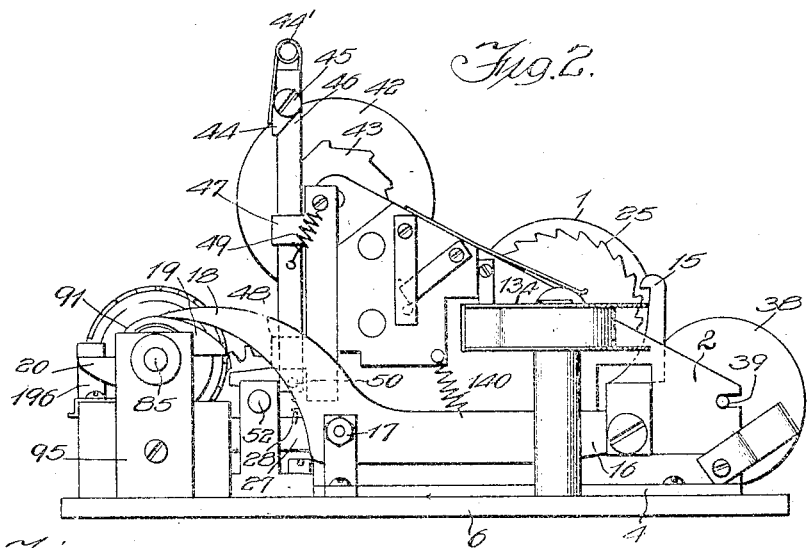

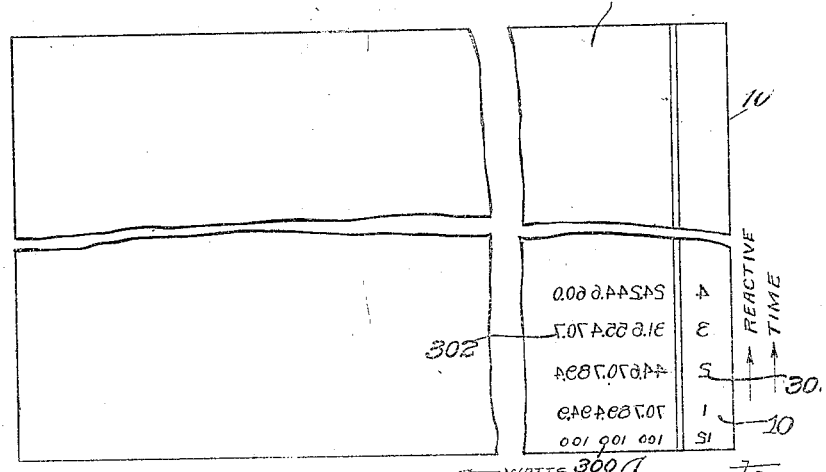

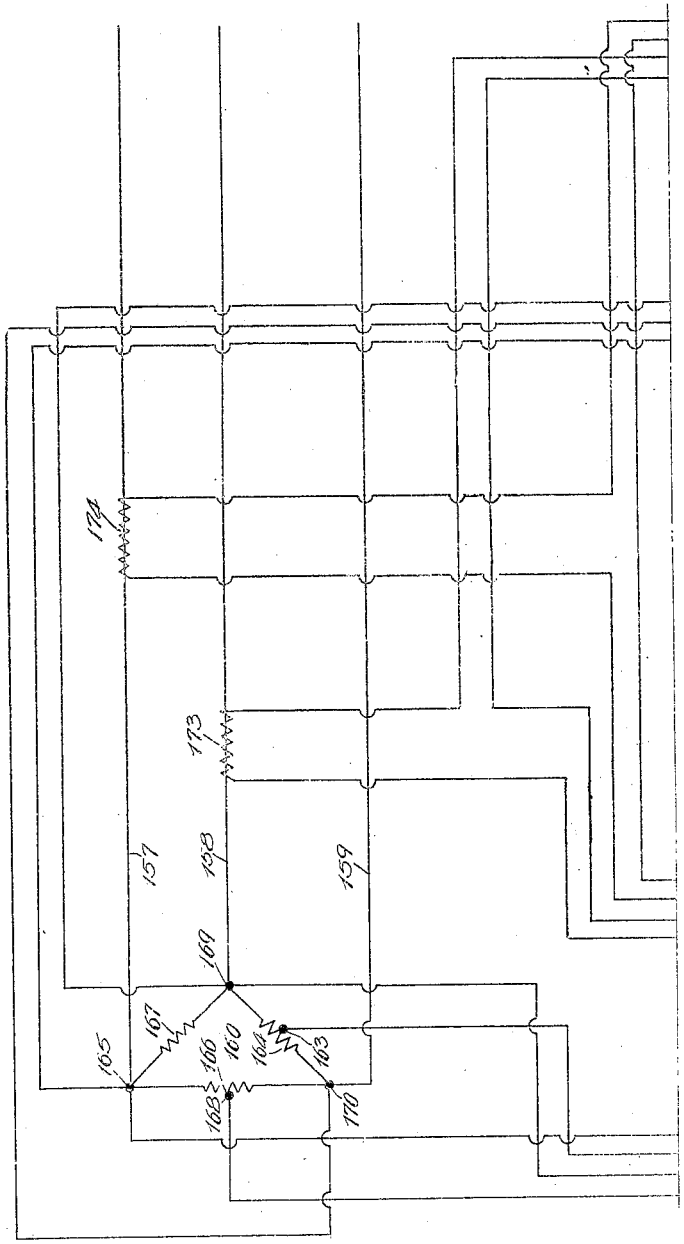

Aug. 5, 1924.

R. F. SCHUCHARDT

METER

Filed May 20, 1921    10 Sheets-Sheet 6

Witnesses:
W. F. Kilroy
Harry R. L. White

Inventor:
Rudolph F. Schuchardt

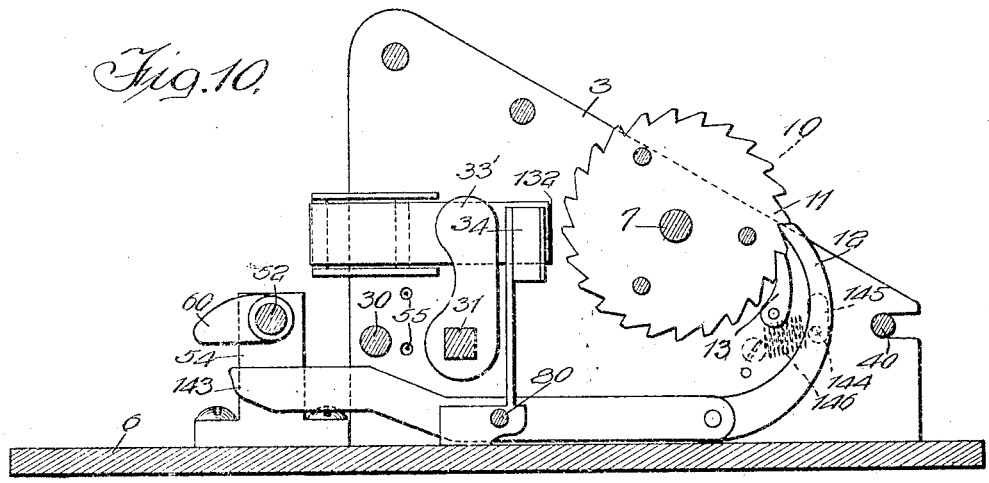
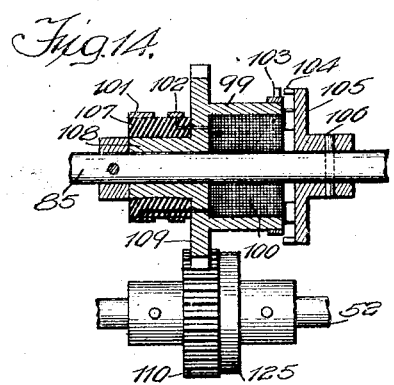
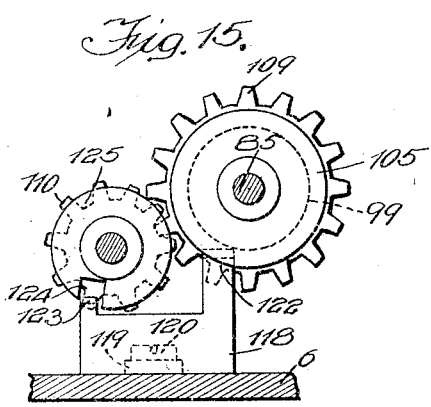
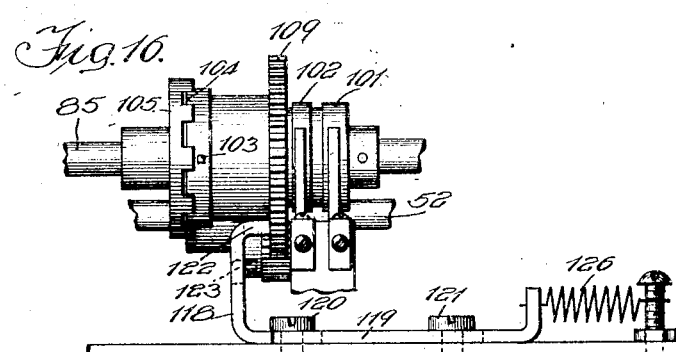

Aug. 5, 1924.

R. F. SCHUCHARDT

METER

Filed May 20, 1921   10 Sheets-Sheet 9

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 3 | | | | | | | | | | | | | | | | | | | | |
| 1 | | | | | | | | | | | | | | | | | | | | |
| 12 | | | | | | | | | | | | | | | | | | | | |
| 11 | | | | | | | | | | | | | | | | | | | | |
| 10 | | | | | | | | | | | | | | | | | | | | |
| 9 | | 91.9 | | | | | | | | | | | | | | | | | | |
| 8 | | 100 | | | | | | | | | | | | | | | | | | |
| 7 | | 94.9 | | | | | | | | | | | | | | | | | | |
| 6 | | 94.9 | | | | | | | | | | | | | | | | | | |
| 5 | | 94.9 | | | | | | | | | | | | | | | | | | |
| 4 | | | | | 92.8 | | | | | | | | | | | | | | | |
| 3 | | | | | | | | | | | | | 90.7 | | | | | | | |
| 2 | | | | | | | | | | | | | | 91.9 | | | | | | |
| 1 | | | | | | | | | | | | | | 91.9 | | | | | | |
| 12 | | | | | | | | | | | | | | | 92.8 | | | | | |
| 11 | | | | | | | | | | | | | | 90.5 | | | | | | |
| 10 | | | | | | | | | | | | | | 91.9 | | | | | | |
| 9 | | | | | | | | | | | | | | 91.9 | | | | | | |
| 8 | | | | | | | | | | | | | 90.7 | | | | | | | |
| 7 | | | | | | | | | | | | 89.4 | | | | | | | | |
| 6 | | | | | | | | | | | | 92.3 | | | | | | | | |
| 5 | | | | | | | | | | | | 92.3 | | | | | | | | |
| 4 | | | | | | | | | | | 87.6 | | | | | | | | | |
| 3 | | | | | | | | | | 85.7 | | | | | | | | | | |
| 2 | | | | | | | | | | 83.2 | | | | | | | | | | |
| 1 | | | | | | | | | | 57.4 | | | | | | | | | | |

Witnesses:
W. P. Kilroy
Harry R. R. White

Inventor
Rudolph F. Schuchardt
By Bruno Boettcher · Drenner
Atty's.

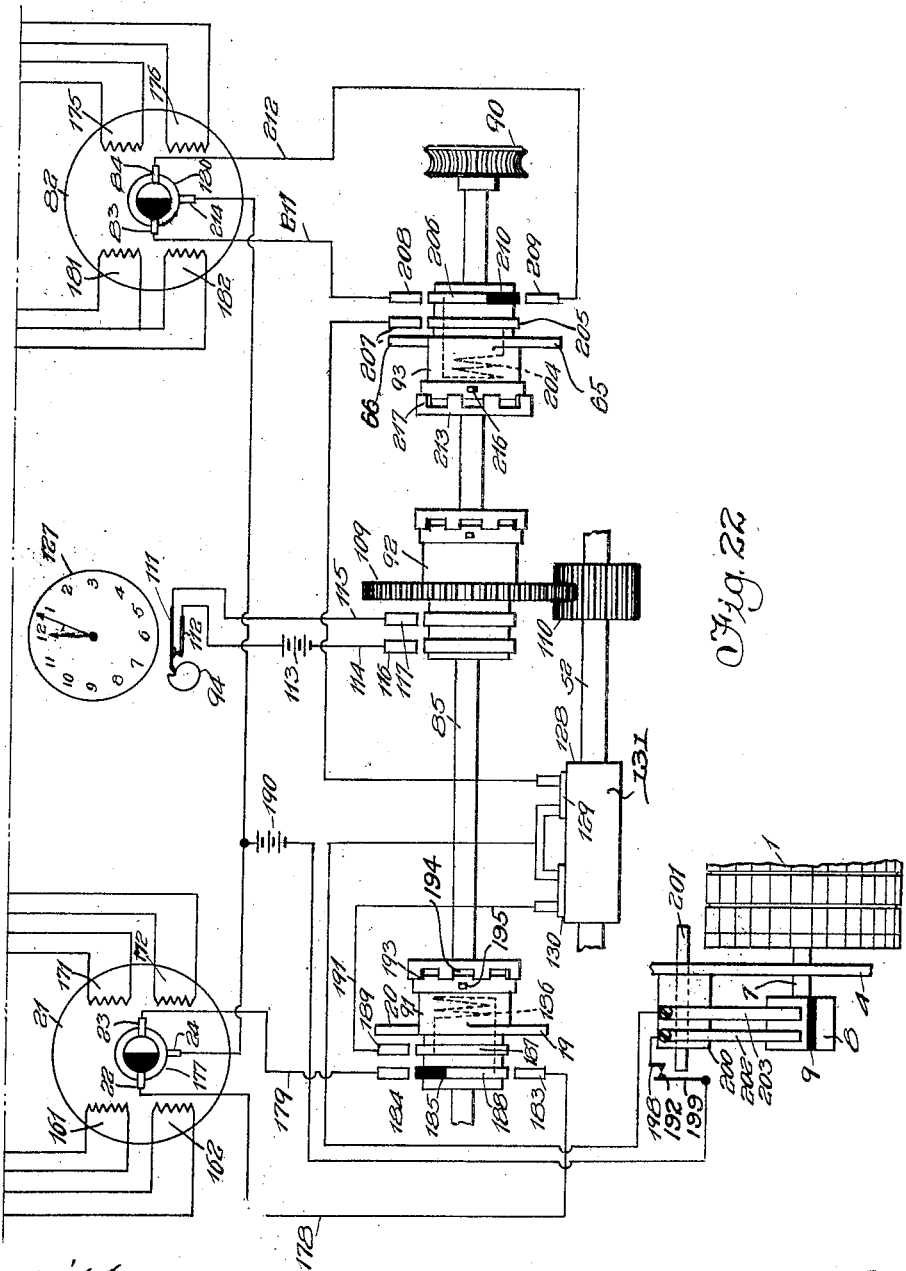

Patented Aug. 5, 1924.

1,504,082

UNITED STATES PATENT OFFICE.

RUDOLPH F. SCHUCHARDT, OF CHICAGO, ILLINOIS, ASSIGNOR TO GENERAL ELECTRIC COMPANY, A CORPORATION OF NEW YORK.

METER.

Application filed May 30, 1921. Serial No. 471,201.

*To all whom it may concern:*

Be it known that I, RUDOLPH FREDERICK SCHUCHARDT, a citizen of the United States, residing at Chicago, in the county of Cook and State of Illinois, have invented a certain new and useful Improvement in Meters, of which the following is a full, true, concise, and exact description, reference being had to the accompanying drawings, forming a part of this specification.

My invention relates to meters, and particularly to meters for measuring or recording power factor, maximum demand, and other functions or characteristics of electrical power flowing over a line. The present invention is an improvement upon the construction shown and claimed in my prior Reissue Patents No. 15,697, granted October 9, 1923, and No. 15,724, granted November 13, 1923. While the present invention is described particularly in connection with a three phase system, the invention is not limited to use in such a system, but may be employed in a system of any number of phases.

The power factor of a three-phase circuit is defined as the ratio of the total watts to the vector sum of the volt amperes in the several phases. The tangent of the angle corresponding to the power factor in a three-phase circuit is the ratio of the reactive component to the watts of the circuit. The power factor meter herein described registers the ratio of the integrated reactive component to the watt hours for any specified period, but prints the corresponding power factor.

If two watt hour meters be so connected to the same circuit that one registers the reactive component and the other watt hours, then the ratio of the registration of the reactive component meter to the power component meter is the tangent of the phase angle of the circuit, as defined above.

If these two meters be provided with contacts similar to the contacts used for operating printometers, then the ratio of the number of contacts made by the reactive component meter to the number of contacts made by the power component meter in any specified time is the tangent of the phase angle of the circuit and from such ratio the power factor of the circuit for the given period of time can be calculated.

Therefore, if the number of contacts made by the reactive component meter be represented by the ordinates on a rectangular system of coordinates and the contacts made by the power component meter be represented by the abscissa, then one line, and only one line, is located in that plane by any combination of contacts corresponding to the value of power factor then prevailing.

To apply this principle to a recording power factor meter, values of power factor are calculated for sufficient number of ratios of contacts to meet all practicable requirements in a specified period of time. These values are set in type on a drum on their proper positions. Operation of the contact of the reactive component meter revolves the drum one step for each contact, corresponding to the ordinates. The operation of the contacts of the power component meter steps a printing mechanism parallel to the shaft of the drum one step for each contact, corresponding to the abscissa. This printing mechanism, therefore, at any instant, registers with the type on the drum corresponding to the power factor of the circuit for the time interval under consideration. By interposing a paper record strip and an ink ribbon between the drum and the printing device and supplying means for pressing the printing device against the drum the record is obtained. The meter is reset to zero at regular intervals.

In order to acquaint those skilled in the art with the manner of constructing and practicing the invention, I shall now describe a specific embodiment of the same, in connection with the accompanying drawings, in which:

Figure 1 is a plan view of the meter embodying my invention;

Figure 2 is a left end elevational view;

Figure 3 is a right end elevational view;

Figure 4 is a section taken on the line 4—4 of Figure 1; and,

Figure 5, together with Fig. 22, illustrates the electrical connections for the meter. Fig. 5 may be considered the upper half and Fig. 22, the lower half of a complete wiring diagram.

Figure 7:
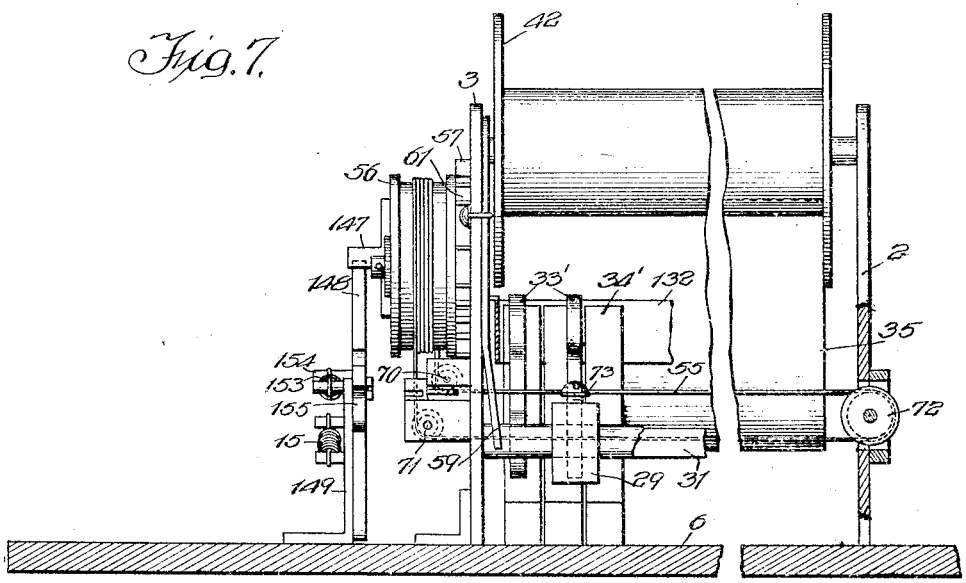
Figure 17:
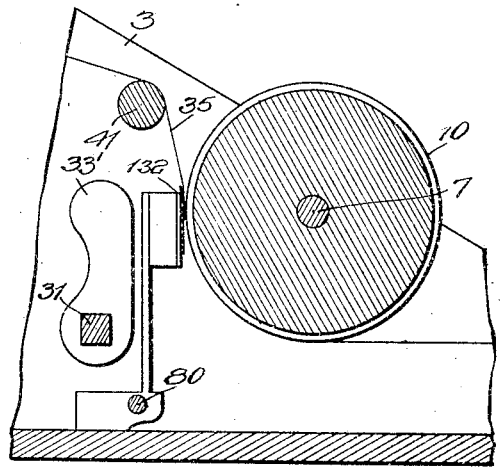
Figure 18:
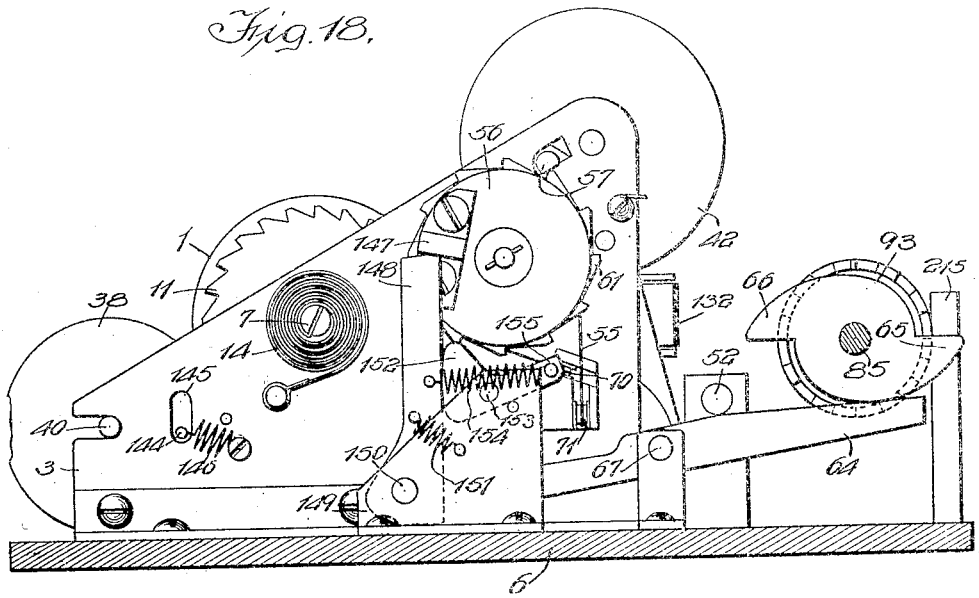
Figure 19:
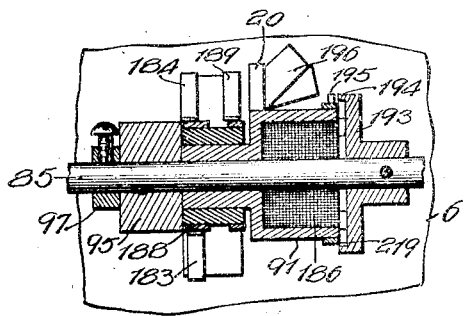

Figure 6 is a developed view of the printing drum;

Figure 7 is a partial section and partial rear elevation showing the mechanism for selecting the desired printing platen or finger;

Figure 8 is a vertical section taken on line 8—8 of Figure 1 showing in elevation the means for advancing the platen selecting mechanism;

Figure 9 is a similar section taken on line 9—9 of Figure 1, showing the organization of parts for advancing the drum rotarily for rocking the printing shaft and for advancing the paper feeding mechanism;

Figure 10 is a similar view taken on line 10—10 of Fig. 1 illustrating the time wheel advancing mechanism;

Figure 11 is a fragmentary plan view illustrating one of the printing fingers shown in side elevation in Figure 4;

Figure 12 is a fragmentary detail view in plan illustrating the pawl for advancing the paper feed as shown at the top of Figure 2;

Figure 13 is a fragmentary detail view illustrating partly in plan and partly in section the cam and pin for operating the paper advancing slide;

Figure 14 is a fragmentary sectional view of one of the magnetic clutch members, namely, the one shown at the middle of Figure 1;

Figure 15 is a fragmentary end elevation of said clutch and the automatic lock and full stroke device for the clutch shown in Figure 14;

Figure 16 is a side view of the device shown in Figures 14 and 15;

Figure 17 is a fragmentary cross sectional view illustrating the run of the paper web, the ribbon and the printing finger;

Figure 18 is an end elevational view from the right of Figure 1 showing the stop for limiting the return movement of the drum for controlling the printing finger selecting member;

Figure 19 is a fragmentary horizontal section and

Figure 20:
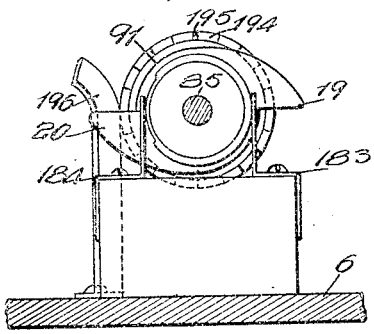

Figure 20 is an elevational end view of the magnetic clutch shown at the left of Figure 1;

Figure 21 is a fragmentary view of a part of record sheet showing the record made by the machine, and Figure 22 is a diagrammatic layout of a system embodying my invention.

The device illustrated in the drawings comprises essentially a drum 1 having thereon in proper position printing numerals for printing the power factor and maximum demand which are to be recorded. The drum is shown in developed form in Figure 6. The surface of the drum is divided into small facets or squares, and numerals are placed upon these facets or squares, the surface being graduated longitudinally of the drum at 300 in terms of watts or power component, and being graduated circumferentially or at right angles thereto at 301 in terms of reactive component. The numerals 302 which are placed in the squares have values corresponding to the power factor. If it is desired to indicate maximum demand, the demand may be indicated in either power component (watts) or reactive component (wattless). If the meter is to be employed as a maximum demand meter only, the reading of power component (watts) and of reactive (wattless) component may be employed or without power factor, and where the meter is to be employed as a power factor meter only, the readings of power factor alone may be employed. At the right hand end of the drum 1 I have provided a time wheel 10, which has figures thereon indicating the time in minutes, or in other suitable divisions of time. This time wheel is adapted to be advanced periodically preferably at the same time that the re-setting of the drum to zero occurs. The drum 1 is journaled on vertical frame plates 2 and 3, which are secured by angle irons 4 and 5 to the main base-plate 6, which forms a mounting for all of the parts hereinafter described. The drum 1 has a shaft 7, which bears at its left end, as viewed in Figure 1, a rotary circuit controller 8, which is provided with a metallic rim, except at the point 9, where an insert of insulation serves to open the main operating circuit of the meter, as will be described later. The time wheel 10, to which reference has previously been made, is mounted on this shaft, and has its periphery, which is graduated in suitable units of time, lying flush with the adjacent periphery of the main drum 1, so that these two members, namely, the drum 1 and the time wheel 10, form mechanically continuous surfaces for the purpose of making a record. The time wheel 10 has an advancing ratchet 11, which is engageable by the pawl 12, and which has a holding pawl 13 (see Fig. 10). The pawl 12 is actuated for each period of time over which a record extends. This time wheel is never re-set, but proceeds continuously, and where the period is one hour this time wheel is preferably advanced in 24 steps. If the period is in half hours, 48 steps may be employed.

The shaft of the drum 1 is connected to a spiral spring 14, so that the drum may be returned to zero periodically (see Figures 1, 3 and 8). The drum is advanced by means of a pawl 15, which pawl is mounted upon the end of a swinging lever 16, shown more clearly in Figure 2. This lever is pivoted at 17, and has an arm 18 adapted to be engaged by cams 19 and 20, whenever the wattless meter 21, which is responsive to reactive component, registers a unit, and makes contact at the points 22 or 23 (see Figure 22). This pawl 15 is adapted to engage a ratchet wheel 25, which is secured to the drum 1.

A holding pawl 26 (see Fig. 9) has a rearwardly extending arm 27, which is adapted to be depressed against the tension of the spring 28 to release the drum 1 at the end of a predetermined period immediately after a record has been made of the advance of the drum. The advancing pawl 15 is guided in the slot 138 formed in the side-plate 4, and is held in proper position by the spring 139. The lever 16, which bears the pawl 15, is retracted by spring 140 (see Fig. 2). The drum 1 is revoluble only, and in order to get a two-dimensional selection of a number on said drum, it is necessary to secure a longitudinal selecting action as by the slider 29 (see Figs. 7 and 11), which is supported upon a pair of shafts 30 and 31 the shaft 30 being preferably round and the shaft 31 being preferably square. The slider 29 has a collar 32 mounted thereon adapted to be slidable on said shaft 31, but rotatable therewith. The collar 32 carries a printing arm 33, which is swung about the axis of the shaft 31 when said shaft is rotated or rocked to engage a corresponding printing platen 34, which presses the paper sheet 35, against the proper numeral on the printing drum. A series of printing platens 34 is mounted in a row on a shaft 80. Each platen cooperates with a circumferential row of type on the drum 1. The slider 29 is moved in steps to select the proper row of type, and the drum is rotated to select the proper individual character. The paper is carried on a supply roll 37, which is supported by the spool 38. This spool is removably journaled in the side-plates 2 and 3, as shown at 39 and 40. (See Fig. 1.) The paper passes between the drum and the printing platens 34, under the drum 1, then over a guiding roller 41, and upon a receiving spool 42, which is journaled at the top of the side plates 2 and 3 (see Fig. 4). The receiving spool 42 has a ratchet wheel 43, adapted to be engaged by a pawl 44 for advancing the paper after each printing operation (see Figs. 2–9–12 and 13). The pawl 44 is pivoted on the pin 45 at the upper end of a vertically slidable rod 46, which rod is guided in a pair of guides 47, 48, and normally held in its upper position by means of the spring 49. The pawl 44 is provided with a suitable spring 44'. The lower end of the rod 46 carries a pin 50, which is adapted to be engaged by a cam-arm 51, (see Figs. 9 and 13) which cam-arm is mounted on a cam-shaft 52, at the rear of the machine, as will be described more in detail later. The shaft 52 is journaled in the boxes 53 and 54, which are mounted at the rear of the device upon the base-plate 6. The slider 29 above mentioned for selecting the longitudinal position on the drum 1 is moved back and forth slidably on the shafts 30 and 31, by means of a flexible cable 55, which is connected to this slider, and which is adapted to be wound upon a drum 56. This drum contains a spring (not shown) for returning the slider 29 to its zero position, namely, furthest to the left, as viewed in Figure 7, when the holding pawl 57 is released. This pawl is pivoted upon a pin 58, and has an arm 59 which extends downwardly and towards the rear, where it may be engaged by the releasing cam 60. The drum 56 has a ratchet wheel 61, which is adapted to be engaged by a pawl 62 for advancing the drum 56, and thereby the slider 29. The pawl 62 is mounted on the end of a lever 63, the rear end or arm 64 of which is adapted to be engaged by the cam members 65, 66. The lever 63 is pivoted at 67 on a bracket mounted on the base-plate 6. A spring 68 tends to hold the pawl 62 in engagement with a pin 69, which forms a throw-out for said pawl as the same is advanced. This spring at the same time tends to hold the pawl 62 and lever 63 in downward or retracted position. The cable 55 is wound about the drum 56 and trained over pulleys 70 and 71, from whence this cable extends horizontally in a loop over the pulley or sheave 72, which is mounted on a frame-plate 2. The cable is attached to the top of the slider 29 at the pin 73, while the lower run of the cable 55 passes through an opening 74 formed in the body of the slider, as will be apparent from Figure 4. The ratchet wheel 61 on the drum 56 is adapted to be engaged by the holding pawl 57, which is mounted upon the upper end of a lever 76 pivoted at 58, and adapted to be held into engagement with said pawl by means of the spring 78. The lever 76 has a downwardly extending arm 59, which is adapted to be engaged by the cam 60 which is mounted on the shaft 52. The drum 1 has circumferential rows of printing numerals, and has corresponding printing platens 34, all hinged on a common rod 80, as is apparent from Figures 4 and 11. The longitudinal movement of the slider 29 is accomplished step by step, in accordance with the registration of units of power upon the power component watt meter 82, as shown in Figure 22. The addition of a unit to the watt meter closes a circuit at the contacts 83 or 84, as the case may be, to advance the slider to select a corresponding printing platen registering with the proper row of numerals on the drum 1.

In order to provide the power for rotating the drum 1, advancing the time wheel 10, stepping forward the slider 29, printing the proper indication at the end of a given period, feeding the paper record sheet, and causing the release of the various parts, I have provided the power shaft 85, which is constantly driven by means of a motor 86, indicated in Figure 3. This motor is mounted in vertical position upon an L-shaped bracket, a portion of which is shown at 87, Figure 3, secured to the base-plate 6, and has a vertical motor shaft 88, upon which is mounted a worm 89. This worm meshes with a worm-wheel 90 rigidly secured to the power shaft 85. I provide a series of clutching solenoids, 91, 92 and 93, which are controlled by the reactive component watt meter 21, the time controlled contact making device 94, and the power component watt meter 82, respectively. The shaft 85 is mounted in bearing blocks 95 and 96, which are best shown in Figure 1. Collars 97 and 98 prevent endwise movement of this shaft. The clutching solenoid 92, which is shown in cross-section in Figure 14, comprises a barrel member 99, which houses the winding 100 of a solenoid, the terminals of which are connected to the slip rings 101 and 102. The barrel 99 carries a clutching pin 103, which is adapted to engage in the serrations 104 of the co-operating clutch member 105, which clutch member is pinned to the shaft 85, as shown at 106, in Figure 14. The barrel 99, with the slip rings 101 and 102, is freely slidable on the shaft 85. The slip rings 101 and 102 are mounted on a sleeve of insulation 107, which, in turn, is borne by an extending hub 108 forming a part of the barrel member 99. A gear-wheel 109 is secured to or formed as a part of the barrel 99, and this gear-wheel is constantly in mesh with a pinion 110, which is mounted on the cam-shaft 52. The winding of the solenoid 100 is adapted to be energized by closing of the contacts 111 and 112 at the time controlled contact making device 94, these contacts periodically closing a circuit through the source of current 113, and wires 114, 115, which wires are connected to the spring contact brushes 116 and 117. Assuming that the contact making device 94 closes the circuit, the solenoid winding 100 will be energized and will move the barrel 99 axially to the right, as viewed in Figures 1 and 14, bringing the pin 103 into engagement with the teeth 104 on the clutch member 105. Since the shaft 85 is in constant rotation, due to the drive of the motor 86, the engagement of the pin with the clutching teeth causes the gear-wheel 109 to drive the pinion 110 and the connected cam-shaft 52. In order to ensure a complete revolution of the shaft 52, I have provided a locking device 118, shown in Figures 15 and 16. This locking device has a base member 119, which is guided on the pins 120 and 121, which pins play in slots formed in said base member 119. The locking member 118 extends upwardly from the base member 119, and bears at its upper end two fingers 122 and 123. The finger 122 is adapted to engage the radial face of the gear-wheel 109, as shown in Figures 15 and 16. The finger 123 engages a notch 124 in the flange 125, which is connected to the pinion 110. When the solenoid 100 is energized, it shifts the gear-wheel 109 to the left, as shown in Figure 16, engaging the finger 122, and moving the locking member 118 to the left, as shown in said figure, against the tension of the spring 126. In thus moving the locking member to the left, it disengages the finger 123 from the notch 124, so that the rotation of the gear-wheel 109, which is clutched to the shaft 85 is free to drive the pinion 110 and the cam-shaft 52 connected therewith. The contact made at the time controlled circuit controller 94, as shown in Figure 5, may be only temporary, and it will be sufficient to energize the solenoid 100, clutch the barrel 99 to the clutch 105, and move the disk or flange 125 so that the finger 123 is out of register with the notch 124. The barrel 99 and clutch member 105 will not be disengaged until the finger 123 comes into register with and drops into the notch 124, whereupon the finger 122 is free to disengage the pin 103 on the barrel 99 from the teeth 104 on the clutch 105. Thus, the stop member 118 serves the dual purpose of ensuring a complete turn of the shaft 52, and of throwing the clutch members 99 and 105 out of engagement after said movement has been completed. The shaft 52 is thus rotated a complete turn for each period of time as registered on the clock 127. The first thing that such rotation does is to open the circuit of the solenoids 91 and 93, as will be described in detail later, so that no advance of the drum rotarily and movement of the slider axially can be accomplished until the movement of the shaft 52 is completed. This function is performed by a circuit controller 128 mounted on the shaft 52, and having the bridging contacts 129 and 130 mounted on a drum 131 of insulation. Mechanically, the first action that is performed by the shaft 52 is operation of the proper printing platen 35 by means of the cam 51; printing is accomplished by partial rotation of the square shaft 31, which shaft, in turn, rocks the finger 33 against the registering printing platen 34, to cause the platen to engage the paper, and press the same against the ribbon 132, which ribbon, through the medium of the type on the drum 1, prints an indication upon the paper of either maximum demand or power factor. The ribbon 132, it will be noticed, is fed from the ribbon spool 133 to the spool 134, in this case manually, suitable guides being provided for holding the ribbon in place between the drum 1 and the paper 35. The square shaft 31 has a lever 135 connected thereto, as shown in Figure 9, this lever extending over the cam 51, and being adapted to be turned in a counter-clockwise direction when the cam 51 is turned in the same direction, whereby the rocking of the square shaft 31 causes the printing finger 33 to engage the selector platen 34, and print an indication for the particular period of time.

Simultaneously with the printing of the indication of the drum 1, I print an indication of the time corresponding with the record of the drum. This is accomplished by an additional printing finger 33' (Figure 17) mounted directly on the square shaft 31 at the extreme right of the instrument, as shown in Figure 1, a corresponding printing platen 34' being mounted in register with said time-wheel 10, so that the printing of the time from the time wheel 10 and the printing of the indication from the drum 1 are made on the record sheet 35.

The next motion of the shaft 52 is to cause engagement between the cam 51 and the pin 50 on the vertically sliding rod 46, to cause the pawl 44 (see Figure 9), to engage the ratchet 43 for advancing the paper 35. When the cam 51 passes the pin 50, the rod 46 will be retracted by the spring 49, the ratchet 43 being held against retrograde movement by the holding pawl 136, as shown in Figure 9. Substantially simultaneously with the movement of the paper advancing pawl 44, the cam 60 at the other end of the cam-shaft 52, engages the releasing arm 59 of the holding pawl 57, which holds the ratchet wheel 61 of the drum 56. This ratchet wheel 61, it will be remembered, is connected by the flexible cable 55 to the slider 29. Thus, the raising of the pawl 57 permits the slider 29 to return to the zero position, under the influence of the spring in the drum 56.

The next step mechanically which occurs during the rotation of the cam-shaft 52 is the release of the holding pawl 26, of the drum 1, as shown in Figure 9.

The drum 1 thereupon returns to its zero position, being stopped in said position by means of a pin or shoulder 141 on the ratchet 25, which engages a stationary pin or shoulder 142 on the side-plate member 4, as shown in dotted lines in Figure 9. The cam 60 thereafter engages the end of the lever 143, which lever is pivoted at 80, as shown in Figure 10, for actuating the advancing pawl 12 of the time wheel 10. The pawl 12 has a pin 144, which plays in the slot 145 for throwing out the pawl after it has completed its stroke. A spring 146 attached to the pin 144 and to the plate member 3, tends to return the pawl and the lever to their retracted position. The pawls 12 and 13, as previously explained, need not be disconnected from the ratchet wheel 11, since this wheel advances in one diection only.

The continued motion of the shaft 52 finally brings the notch 124 and finger 123 into register, whereupon the finger 122 presses upon the radial face of the gear-wheel 109 (see Figures 15 and 16), with the result that the pin 103 is pushed out of the serrations 104, and the motion of the shaft 52 is at the same time stopped by the dropping of the stop finger 123 into the notch 124.

Since the motion of the slider 29 must extend over a considerable distance, and it is inadvisable to make the drum 56 of a diameter large enough to accomplish this movement in a single revolution, I employ a drum of relatively small size, and cause it to move through more than one complete revolution for securing the full limit of motion of the slider 29. In order to bring the drum to rest with the slider 29 in proper zero position, I provide the stop mechanism shown in Figures 7 and 18. I provide a projecting pin or shoulder 147 on the drum 56, and mount a swinging stop finger 148 upon a bracket 149 mounted on the base-plate 6. This stop finger is pivoted at 150, and is normally swung to the right by means of the spring 151. The finger 148 engages a co-operating stop member 152, which is pivoted at 153 to the bracket member 149. A spring 154 connected by means of suitable pins tends to hold the stop finger 148 and the stop member 152 in engagement. The drum 56 in advancing the slider 29, moves in a clockwise direction, as viewed in Figure 18. As the drum rotates, the stop pin or shoulder 147 moves around, just clearing the arm 155 of the stop member 152. Upon further rotation, the pin 147 engages the stop finger 148, and moves it to the left, as shown in Figure 18. Thereupon, a spring 154, swings the stop member 152 about its pivot 153, in a counter-clockwise direction, thereby bringing the arm 155 out into the path of the pin 147. The parts are so proportioned and arranged that the arm 155 of the stop member 152 forms a limit or stop for the outer motion of the slider 29. When the pawl 57 is disengaged from the ratchet 61, the spring which is contained within the drum 56 tends to return the drum to its original position through counter-clockwise motion thereof. The pin 147 is free to pass the stop finger 148, since this finger has been thrown outwardly out of the path of said pin, and has been held in such position by the stop member 152, which is cam-shaped, as is clearly illustrated in Figure 18. Upon completing the first revolution in a retrograde direction, the drum 56 brings the pin 147 into engagement with the arm 155, forcing the same downwardly out of the path of said pin. Thereupon, the stop finger 148 is free to return under the influence of the spring 154, to the position shown in Figure 18, where it forms a stop for the return motion of the drum for stopping the slider 29 in its zero position.

As was previously explained, to measure the power factor of a three-phase circuit, I employ two integrating watt meters 21 and 82, respectively, as indicated in Figure 22, one watt meter being adapted to register the reactive component flowing through the three-phase circuit, and the other meter being adapted to register the power component or k. w. flowing through the circuit. I have shown in Figure 5 a three-phase transmission line having the wires 157, 158 and 159 fed from a delta-connected bank of transformers 160. The pressure coils 161 and 162 of the watt meter 21 are connected from the neutral point of one phase winding to the common or joining point of the other two phase windings; for instance, the winding 161 is connected between the neutral point 163 of the winding 164 and the joining point 165 between phase windings 166 and 167. In a similar manner, the watt meter winding 162 is connected between the neutral point 168 of the phase winding 166 and the common joining point 169 of the two phase windings 164 and 167. The current coils 171 and 172 of this watt meter 21 are connected in series with series transformer windings 173 and 174, which current transformer windings are energized by the current flowing in the line wires 158 and 157, respectively. In this manner the watt meter 21 is able to register in accordance with the wattless component flowing in the three phase circuit. The power component or k. w. meter 82 is connected in the usual manner for registering k. w., with its potential coils 181 and 182 connected across the phase windings 164 and 166 respectively. The current coils 175 and 176 of the watt meter 82 are connected in series with the current transformer windings 173 and 174 respectively. Thus, the power component or watt meter 82 registers in terms of watts the actual power passing through the three phase line.

It is obvious that my invention may be employed in connection with a single phase circuit, as the connection for a reactive meter and a power component meter for single phase lines is disclosed in said prior patent to Schuchardt. I shall now describe the operating circuits for the recording meter, in connection with the diagram of Figure 22.

The reactive component meter 21 and rotatable contact making device 177, which is adapted to close contact alternately with the contacts 22 and 23, these contacts co-operating with a common battery contact 24 to close the energizing circuit for the solenoid clutch 91, alternately over the wires 178 and 179. Wires 178 and 179 are connected to brushes 183 and 184, which co-operate with a rotatable contact making device 185 carried on the shell of the clutch solenoid 91. The clutching solenoid 91 comprises a winding 186, which is connected between the slip rings 187 and 188. The slip ring 187 is a continuous conductor engaged by the brush 189, which brush is connected through a battery or other source of current 190 over a wire 191, and through the periodic circuit controller 131 and the longitudinal circuit controller 192 to the brush 24 at the watt meter 21. The slip ring 188 presents a conducting surface to the brushes 183 and 184 for only a portion of its circumference. This is for the purpose of switching the circuit alternately from the wires 178 and 179 and causing the break of the current flow to occur at the slip ring 188 instead of at the contact making device 177 of the meter 21. The solenoid clutch 91 has a co-operating clutch member 193, which has serrations 194 adapted to be engaged by a pin 195, which pin is mounted on the barrel of the member 91. The clutch member 193 is pinned to the shaft 85, the solenoid clutch member 91 being mounted to rotate freely on the shaft 85. When the winding 186 is energized, the member 91 is drawn to the right, as shown in Figures 5 and 19, throwing the pin 195 into mesh with the serrations 194 to clutch these two members together. A throw-out spring 196 is adapted to engage the cam-arms 20 and 19, and hold the member 91 out of engagement with the member 193. Consequently, the energization of the winding 186 must first overcome the spring 196 to bring the two clutch parts into engagement, whereupon they will remain in engagement until the circuit controller 185 rotates the insulated portion of the slip ring 188 under the live brush either 183 or 184 to break the circuit. This is timed to occur substantially at the same time that the arms 19 or 20 engage the throw-out spring 196, to secure disconnection of the two clutch members at a predetermined position of the cam members 19 and 20.

The battery circuit for the clutch 91 is cut through the periodic circuit controller 131, through the longitudinal circuit controller 192 and through the rotary circuit controller 8. The periodic circuit breaker 131 is mounted on the shaft 52, and is arranged to break the energizing circuit for the clutches 91 and 93, whenever the shaft 52 is moved from neutral position. The purpose of this is to prevent losing of a count or registration on one of the meters 21 or 82.

The longitudinal circuit breaker 192 comprises the stationary spring 198 and the movable spring 199 mounted on the side of a block of insulation 200, which block of insulation is supported at the left hand end of the machine, as shown in Figure 1, on the side-plate 4. A plunger 201 of insulation passes through this block, and is adapted to engage the spring 199 to disengage it from the spring 198 to open the battery circuit. This plunger lies in the path of the printing finger 33 and is engaged to stop accumulation of any further counts during the particular period of time, in case the capacity of the machine is exceeded. In other words, if more units of k. w., or power component accumulate during a given period namely, a half hour or hour, as the case may be, than the length of the cylinder will permit, the movement of the printing finger 33 on the carriage 29 to the extreme left of the machine, as viewed in Figure 1, will cause the opening of this battery circuit.

A similar protective arrangement is desirable in connection with the rotation of the drum 1, and I have provided the rotary circuit breaker 8, which consists of a metallic ring secured on the end of the shaft 7, this ring having an insert of insulation 9 adapted to break the circuit between the springs 202 and 203 when the drum is revolved to the limit of its rotary motion. The limit of motion is determined by the engagement of the pin 141 on the ratchet wheel 25, with the lower surface of the pin 142 on the frame-plate 4, (see Figure 9). The rotation of the solenoid clutch 91 with the shaft 85 causes the cam-arms 19 or 20 to raise the arm 18, and thereby depress the pawl 15, and advance the drum 1 one step. If the shaft 52 is off normal, or if the longitudinal slider 29 is at the limit of its motion, or if the drum 1 is at the limit of its rotary motion, the solenoid clutch 91 will not be energized until all of said parts as again in normal position, at which time the rotary circuit will be closed.

The solenoid clutch 93 for the power component watt meter 82 is of a similar construction, and it comprises a winding 204 connected to the slip rings 205 and 206, engaged by the brushes 207, 208 and 209 respectively, these brushes being mounted upon a suitable block of insulation, or otherwise suitably supported upon the baseplate 6. The slip ring 206 has a portion 210 of insulation for breaking the circuit at the brushes 208 or 209, as the case may be, when the solenoid clutch 93 is engaged with the stationary clutch member 213, which is pinned to the shaft 85. The brush 208 is connected over the conductor 211 with the corresponding brush 83 on the contact making device 180 of the power component meter 82. The brush 209 is similarly connected to brush 84 of the meter 82 over conductor 212. The brush 207 is connected through the battery circuit to the brush 214 of the contact making device 180. The operation of the solenoid clutch 93 is similar to the operation of the clutch 91. This clutch 93 has a pair of operating cam arms 65, 66 adapted to engage the arm 64 of the lever 63 for actuating the drum 56, which drum controls the movement of the slider 29. A throw-out spring 215 controls the disconnection of the barrel of the clutch member 93 from the member 213. The barrel of the member 93 has a pin 216 adapted to engage the serrations 217 on the member 213.

The solenoids of the clutch device, 91, 92 and 93, are provided with copper rings 219, as are clearly shown in Figures 14 and 19, for causing a slow release of the parts of the various clutches.

The operation of the device may be briefly recapitulated as follows: The reactive component meter 21 controls the magnetic clutch 91 to connect the constantly driven shaft 85 through a cam mechanism to a pawl and ratchet mechanism for advancing the drum rotarily. The power component meter 82, in a similar manner, controls through a magnetic clutch the connection of the constantly driven shaft 85 through a pawl and ratchet advancing mechanism, the advance of the slider 29 longitudinally on the drum 1, the drum being graduated in terms of power factor, namely, in terms of the cosine of the angle whose tangent is the ratio of reactive component to power component, will give, at the registering point of the slider and the drum, an indication of the power factor over the period during which integrated values of reactive component and power component have been considered.

Theoretically, if the units of time are made small enough, the device may become a direct indicating meter, and I do not limit the device of my invention to extended periods of time nor to actual printing of a record for each period of time.

However, in the specific machine which I have illustrated, the clock 127 periodically closes the circuit of the magnetic clutch 92 to cause the cam shaft 52 to be actuated a complete revolution. Such revolution causes, first, the opening of the battery circuit, thereby preventing the loss of a count from either of the meters 21 or 82, then prints the indication determined by the two meters 21 and 82, then advances the record sheet, then releases the slider 29, and restores it to zero, then releases the drum 1 and restores it to zero, and thereafter advances the time wheel 10. Advancement of either the drum 1 or the slider 29 to the extreme limit of movement will cut off further operation of the advancing mechanisms for these elements until the beginning of the next period.

It will be noticed that the record sheet is adapted to receive impressions over any portion of its surface, and that the actual imprint will be made at a point corresponding in distance from the zero end of the drum to the variable, in this case power component, which controls the longitudinal advance of the slider. Consequently, the indication will be printed at a position on said drum which will correspond to the value of the longitudinal component. Thus, the record sheet itself indicates directly by the position of the printed characters the value of one of the variables, namely, power component. This means that after the record is made, it is possible to select from the record instantly by inspection the maximum demand in terms of power component of the load over the period which is printed on the particular portion of the record sheet.

It is obvious that the relation of power and wattless component may be interchanged, so that if desired the wattless component may be indicated in the same manner as power component. Thus, on Figure 21, the printed numerals over the surface of the chart indicate by their distance from the left the power component or k. w. value of the load at the given hour corresponding to the index figures at the extreme left of the sheet. It is thus possible to ascertain that the maximum demand in this particular instance occurred at the hour of 12:00 in the middle of the day, the lighter figures at the left indicating A. M., and the heavier figures at the left indicating P. M.

Numerous modifications may be made without departing from my invention.

I claim:

1. In combination, a meter for measuring unitary values of a variable, a constantly driven shaft, a type wheel adapted to be advanced progressively in steps corresponding to the registration of units on such meter, advancing means for said type wheel, and means controlled by said meter for clutching said shaft to said advancing means.

2. In combination, a meter for measuring unitary values of a variable, a constantly driven shaft, a recording chart, a record sheet, movable means for selecting a graduation on said chart corresponding to the unitary values registered by said meter, means for advancing said selecting means, and means controlled by the meter for clutching said shaft to said advancing means.

3. In combination, a meter for measuring unitary values of a variable, a constantly driven shaft, a record sheet, a recording chart, movable means for selecting a graduation on said chart corresponding to the unitary values registered by said meter, means for advancing said selecting means, means controlled by the meter for clutching said shaft to said advancing means, means for printing a selected indication on said chart on said record sheet, and means actuated by said constantly driven shaft for periodically actuating said printing means.

4. In combination, a pair of meters for registering unitary values of two variables, a two-dimensional chart having graduations over the entire surface thereof in terms of a function of said variables, a selecting member for selecting a single graduation on said chart, said selecting member and said drum having relative motion with respect to each other in two dimensions, said relative motion in two dimensions being controlled by said two meters, a constantly driven shaft, and time controlled means adapted to be connected to said shaft for making a record of the selected graduation on said drum.

5. In combination, a pair of meters for measuring unitary values of two variables, a chart having graduations in two dimensions over its entire area in terms of a function of said two variables, means controlled by one of said meters for making a selection in one dimension on said chart, and means controlled by the other meter for making a co-operating selection in the other dimension on said chart, a constantly driven shaft, printing means for periodically printing the value of the graduation determined by said two selections, and time controlled means for clutching said constantly driven shaft to said printing means.

6. In combination, a pair of meters for measuring unitary values of a variable, a printing surface graduated in two dimensions in terms of a function of said variable, an electrical circuit controlled by one of said meters for selecting graduations in one dimension on said chart, a second electrical circuit controlled by the other meter for selecting graduations in another dimension on said chart, periodically actuated means for printing the indication determined by said two selections, and means for opening said circuits during said printing operation.

7. In combination, a meter for measuring unitary values of a variable, a printing wheel, an electrical circuit controlled by said meter for advancing said printing wheel in steps corresponding to the unitary values registered by the meter, time controlled means for periodically opening said circuit independently of the advancing of said printing wheel, and for printing an indication on said printing wheel.

8. In combination, a printing wheel having type thereon, a meter for measuring unitary values of a variable, an electrical circuit controlled by the meter for advancing the printing wheel progressively to select a printing character corresponding to the registration of unitary values by said meter, time controlled means for printing the character so selected, and means controlled by said time controlled means for disabling said electrical circuit temporarily.

9. In combination, a printing drum having printing characters arranged in circumferential and longitudinal rows, a meter controlled by reactive component for selecting a row in one dimension, a meter controlled by power component for selecting a row in another dimension, a constantly driven shaft, printing means for making a record of the printing character common to said two rows, and time controlled means for periodically connecting said shaft and said printing means.

10. In a device of the class described, a printing drum, a constantly driven shaft, a meter responsive to a characteristic of the current flowing in a conductor, said drum being graduated in two dimensions, selecting means operating with the drum and movable relative thereto for selecting any desired graduation on said drum, means controlled by said meter for connecting said shaft with said selecting means.

11. In combination, a meter responsive to a function of the power component flowing in a conductor, a second meter responsive to the function of the reactive component flowing in a conductor, a chart graduated in two dimensions in terms of the function of the two components, a constantly driven shaft, reference means for selecting an indication on the chart, said reference means and said chart being relatively movable with respect to each other, and means controlled by said meters and operated by said shaft for securing the relative movement of said reference means and said chart to select the corresponding function.

12. In a device of the class described, a cylindrical drum, the surface of the drum having a zero point and being graduated in two dimensions to form rectangular unit areas, said unit areas having printing characters thereupon, each character being a trigonometric function of the location of the unit area with respect to the zero point, printing means for printing a desired printing character from said drum, a constantly driven shaft, and means for periodically connecting said driven shaft to said printing means.

13. In combination, a rotatable drum graduated in two dimensions, printing platens co-operating with circumferential rows of printing characters on said drum, selecting means for selecting the desired one of said printing means and means periodically actuated for operating the selected printing means, and means for restoring the drum and said selecting means to zero position.

14. In a meter of the class described, a printing drum graduated in two dimensions, means for progressively advancing the drum in a rotary direction, means movable longitudinally of the drum and progressively movable to select a desired printing character on said drum, means for periodically printing the selected printing character and thereafter restoring the drum and said selecting means to zero position.

15. In combination, a printing drum, means comprising an electric circuit for advancing said drum step by step, rotary selecting means for selecting a particular portion of the drum, said selecting means being movable longitudinally of the drum, means for operating said selecting means, comprising an electric circuit, a switching means controlled by a predetermined degree of motion of said drum for opening one of said circuits.

16. In combination, a printing drum, means comprising an electric circuit for advancing said drum step by step, rotary selecting means for selecting a particular portion of the drum, said selecting means being movable longitudinally of the drum, means for operating said selecting means, comprising an electric circuit, switching means controlled by a predetermined degree of motion of said drum for opening one of said circuits, and means controlled by the extreme motion of the selecting means to open one of said circuits.

17. In combination, a rotatable drum having printing characters, a shaft journaled parallel to said drum, means co-operating with the parallel shaft for printing a record from said drum, a power shaft parallel to said first shaft, and time controlled means governing the connection of said parallel to said power shaft for operating said printing means.

18. In combination, a pair of meter elements responsive to different characteristics of electric power flowing in a line, a rotatable drum controlled by one of said meters, an operating selecting means controlled by the other meter, said drum being graduated over its surface in accordance with a function of said two characteristics, a record sheet of the full width of the drum, and printing means periodically actuated for printing on said record sheet the selected indication on the drum.

19. In combination, a printing drum, a time wheel co-axial with the drum, means for advancing the time wheel periodically, a meter, means controlled by the meter for advancing the drum, a second meter, said drum being graduated throughout its surface in terms of a function of the quantities measured by said meters, a selecting means controlled by said second meter for selecting a corresponding indication on said drum, and printing means for periodically printing the indication of the time wheel and of the drum.

20. In combination, a printing drum having a plurality of rows of printing characters arranged circumferentially and longitudinally, means controlled by one variable for advancing the drum rotarily, a plurality of printing platens arranged along a predetermined line adjacent the drum, a shaft parallel to the drum and adjacent said printing platens and a slider controlled by a different variable and adapted to be advanced along said shaft for selecting the proper one of said printing platens, and means for periodically rocking said shaft to cause said slider to engage the proper printing platen to make a record from said printing drum.

21. In combination, a printing drum, an operating slider, a cam shaft parallel to the drum, a power shaft, means for advancing the drum, cam means on the power shaft co-operating with said advancing means, advancing means for the slider, cam means on the power shaft co-operating with said latter advancing means, means on the power shaft for driving said cam shaft, and electric clutches for controlling both of said cam means and said latter connecting means.

22. In combination, a printing wheel, a ratchet connected with said printing wheel, a power shaft, means for constantly driving said power shaft, cam means on said power shaft for operating said ratchet, an electric clutch for connecting said cam with said power shaft, an electric meter controlling said clutch, and a two-way circuit connecting said clutch and said meter, said clutch having current controlling means for breaking one path of the two-way circuit, and establishing another path thereof.

23. In combination, a printing surface, means movable longitudinally thereof for selecting a desired printing character, a power shaft, means for constantly driving said power shaft, ratchet means for moving said selecting means, cam means on said power shaft for operating said ratchet means, an electric clutch for connecting said cam with said power shaft, an electric meter controlling said clutch, and a two-way circuit connecting said clutch and said meter, said clutch having current controlling means for breaking one path of the two-way circuit and establishing another path thereof on each operation.

24. In combination, a printing drum, pawl and ratchet means for rotating the drum, a selecting means longitudinally movable of the drum, a pawl and ratchet means for moving said selecting means, a meter controlling said first ratchet means, a second meter controlling the second ratchet means, a power shaft, electric means for controlling the connection of said power shaft with both of said pawl and ratchet means, printing means for the drum, a time controlled means governing said printing means, and means controlled simultaneously with the printing means for preventing the operation of both of said pawl and ratchet means.

25. In combination, a drum, pawl and ratchet means for rotating the drum, a selecting device movable longitudinally of the drum, pawl and ratchet means for advancing said selecting means, a constantly driven power shaft, a meter, clutch means controlled by said meter for connecting said constantly driven power shaft to the pawl and ratchet means for the drum, a second meter and a second clutching means for connecting said constantly driven shaft to the pawl and ratchet means of the selecting means, and means for periodically printing the indication on said drum selected by said selecting means.

26. In combination, a drum, a record sheet of the same width as the drum, a power shaft arranged substantially parallel to the drum, a pawl and ratchet mechanism for advancing the drum rotarily step by step, a cam member on said power shaft, an electric clutch for clutching said cam member to said shaft, said cam member controlling said pawl and ratchet mechanism.

27. In combination, a drum, a record sheet of the same width as the drum, a power shaft arranged substantially parallel to the drum, a pawl and ratchet mechanism for advancing the drum rotarily step by step, a cam member on said power shaft, an electric clutch for clutching said cam member to said shaft, said cam member controlling said pawl and ratchet mechanism, printing means for periodically printing a record from the drum, and means controlled by said printing means for disabling said clutching means, and for restoring said drum to zero position.

28. In combination, a movable printing drum, a slidable selecting member co-operating with the drum, printing means adapted to be operated by said selecting member, a power shaft, a cam shaft, a record sheet having means for advancing the same, means for restoring said drum to zero position, means for restoring said selecting means to zero position, a time controlled means for connecting said cam shaft to said power shaft, for printing a record of said drum, for advancing said record sheet and for restoring the drum and selecting means to zero position.

29. In combination, a pair of meters subject to independent variables, a member having printing characters, means subject to one of said meters for making a selection on said printing member corresponding to one variable, means subject to the other meter for making a co-operating selection on said member corresponding to the value of the second variable, electric circuits for making said selection controlled by said meters, a printing device, and time controlled means for operating said printing device, said printing device having means for temporarily disabling said electric circuts.

30. In combination, a horizontal printing drum, a pair of frame members for supporting said drum, a pawl and ratchet mechanism at one end of said printing drum for advancing the drum step by step, a time wheel supported co-axially with the drum and having pawl and ratchet mechanism for advancing the same at the other end of the drum, a constantly driven power shaft mounted on the base member parallel with the printing drum, separate cam means for each of said pawl and ratchet mechanisms, and electro-magnetic clutch members for controlling the connection of said shaft with said pawl and ratchet mechanisms.

31. In combination, a base member, a pair of frame members, a drum shaft mounted upon said frame members, a drum on said drum shaft, a pawl and ratchet mechanism for advancing the drum on the drum shaft, a power shaft mounted upon the base member, cam means for operating the pawl and ratchet mechanism, an electro-magnetic clutch controlling the connection of said cam to said power shaft, a control circuit for said electro-magnetic clutch, and a circuit controller for said electric circuit connected to said drum for opening said circuit when the drum has been advanced to a predetermined position.

32. In combination, a base member, a pair of frame members, a drum having a shaft mounted in said frame members, means for advancing said drum progressively in steps, a shaft mounted on said frame members, a member slidable on said shaft, means mounted on said slidable member for printing a selected indication from said drum when said shaft is rocked, meters controlling the advance of said drum and the advance of said sliding member, and time controlled means governing the periodic rocking of said latter shaft to print an indication on the drum.

33. In combination, a base member, a pair of frame members, a drum having a shaft mounted in said frame members, means for advancing said drum progressively in steps, a shaft mounted on said frame members, a member slidable on said shaft, means mounted on said slidable member for printing a selected indication from said drum when said shaft is rocked, meters controlling the advance of said drum and the advance of said sliding member, and time controlled means governing the periodic rocking of said latter shaft to print an indication on the drum, releasing means for the drum and for said sliding member, spring means for restoring said drum and said slider to zero, and means controlled by said time controlled means for releasing the drum and slider after said shaft is rocked.

34. In combination, a drum bearing printing characters, a slider movable longitudinally of the drum for selecting a printing character on the drum, a pawl and ratchet means for advancing the slider, a power shaft, cam means adapted to be driven by the power shaft for advancing the slider, an electric circuit for controlling the connection of the cam means to the power shaft, and means controlled by the slider to open said electric circuit when the slider advances to a predetermined position.

35. In combination, a drum bearing printing characters, a slider movable longitudinally of the drum for selecting a printing character on the drum, a pawl and ratchet means for advancing the slider, a power shaft, cam means adapted to be driven by the power shaft for advancing the slider, an electric circuit for controlling the connection of the cam means to the power shaft, means controlled by the slider to open said electric circuit when the slider advances to a predetermined position, means for printing the indication selected by the slider, and a circuit controller governed by said printing means for opening said electric circuit while said printing means is operating.

36. In a power factor meter, a drum having circumferential and axial rows of printing characters, means for rotating the drum in accordance with one of the factors controlling power factor, a slider movable longitudinally of the drum and controlled by another of the factors controlling power factor, a record chart of the width corresponding to the length of the drum and being adapted to receive impressions from the drum of power factor, said impressions being spaced on said record sheet to trace a graph of maximum demand in terms of one of the factors controlling power factors.

37. An integrating watt meter for power component, an integrating watt meter for reactive component, a power driven mechanism controlled by the integrations of said watt meters and by a timing device for registering the power factor as determined by the measurements of said watt meters over a predetermined interval, a record sheet of appreciable width upon which the value of the power factor is recorded by said mechanism and means included in said mechanism whereby the transverse position of the record of the power factor on said sheet is an indication of the maximum demand of one of said meters over the said predetermined interval.

38. An integrating watt meter for power component, an integrating watt meter for reactive component, a mechanism controlled by the integrations of said watt meters and by a timing device for registering the power factor as determined by the measurements of said watt meters over a predetermined interval, a record sheet of appreciable width upon which the value of the power factor is recorded by said mechanism and means included in said mechanism whereby the transverse position of the record of the power factor on said sheet is an indication of the maximum demand of the power component meter over the said predetermined interval.

39. A power factor printometer, comprising printing mechanism, selecting mechanism for said printing mechanism, a record sheet, means responsive to the watt and wattless components of an alternating current circuit for operating said selecting mechanism to select a printing character indicative of the average power factor of said circuit, one portion of said selecting mechanism having a movement transverse to said record sheet proportional to one of the components, time controlled means for operating said printing mechanism to print said character on said record sheet and to return said one portion of the selecting mechanism to a zero position adjacent one edge of said record sheet, whereby the transverse position of the printed indication on said record sheet is an indication of the maximum demand of one of said components over the given time interval.

In witness whereof, I hereunto subscribe my name this 3rd day of May, 1921.

RUDOLPH F. SCHUCHARDT.